(12) United States Patent
Aiuchi et al.

(10) Patent No.: US 10,737,580 B2
(45) Date of Patent: Aug. 11, 2020

(54) VEHICLE

(71) Applicant: SUBARU CORPORATION, Tokyo (JP)

(72) Inventors: Yuji Aiuchi, Tokyo (JP); Katsumi Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 87 days.

(21) Appl. No.: 15/949,778

(22) Filed: Apr. 10, 2018

(65) Prior Publication Data

US 2018/0312068 A1    Nov. 1, 2018

(30) Foreign Application Priority Data

Apr. 28, 2017   (JP) ................. 2017-089156

(51) Int. Cl.
*B60L 53/14*    (2019.01)
*A61G 3/08*    (2006.01)
(Continued)

(52) U.S. Cl.
CPC ............ *B60L 53/14* (2019.02); *A61G 3/0808* (2013.01); *B60L 53/36* (2019.02); *A61G 5/04* (2013.01);
(Continued)

(58) Field of Classification Search
CPC ..... Y04S 30/12; Y02T 90/168; A61G 3/0808; A61G 5/04; B60L 53/14; B60L 53/36;
(Continued)

(56) References Cited

U.S. PATENT DOCUMENTS 6,014,597 A * 1/2000 Kochanneck ............ B60K 1/04
701/22
7,429,155 B2 * 9/2008 Sakano ................ A61G 3/0808
410/7
(Continued)

FOREIGN PATENT DOCUMENTS

CN    201989692 U    9/2011
CN    106515883 A    3/2017
(Continued)

OTHER PUBLICATIONS

Japanese Office Action, dated Jan. 22, 2019, in Japanese Application No. 2017-089156 and English Translation thereof.
(Continued)

*Primary Examiner* — Paul N Dickson
*Assistant Examiner* — Timothy Wilhelm
(74) *Attorney, Agent, or Firm* — McGinn I. P. Law Group, PLLC.

(57) ABSTRACT

A vehicle includes a vehicle body, a positioning mechanism and an electric power supply unit. The vehicle body is configured to be able to carry a sub-mobility device in which a passenger sits. The sub-mobility device includes an electric power receiving unit. The positioning mechanism is provided in the vehicle body and configured to position the sub-mobility device in the vehicle body at a predetermined location. The electric power supply unit is provided in the vehicle body and configured to supply electric power to the electric power receiving unit of the sub-mobility device positioned at the predetermined location, by contacting or approaching the electric power receiving unit.

18 Claims, 9 Drawing Sheets

(51) Int. Cl.
  *B60L 53/36* (2019.01)
  *A61G 5/04* (2013.01)
  *B60L 53/12* (2019.01)

(52) U.S. Cl.
  CPC .......... *B60L 53/12* (2019.02); *B60L 2200/24* (2013.01); *B60L 2240/622* (2013.01)

(58) Field of Classification Search
  CPC .............. B60L 53/12; B60L 2240/622; B60L 2200/24; B60L 2200/34; B60P 3/077
  See application file for complete search history.

(56) References Cited

U.S. PATENT DOCUMENTS

| | | | | |
|---|---|---|---|---|
| 8,920,082 | B2* | 12/2014 | Bryant | B60P 3/064 |
| | | | | 410/4 |
| 9,440,685 | B2* | 9/2016 | Suzuki | B60J 5/02 |
| 9,527,394 | B1* | 12/2016 | Tang | B60L 11/1818 |
| 10,245,204 | B2* | 4/2019 | Sandler | A61G 5/14 |
| 10,293,697 | B2* | 5/2019 | Goitsuka | B60K 15/063 |
| 2010/0065352 | A1 | 3/2010 | Ichikawa | |
| 2011/0148351 | A1 | 6/2011 | Ichikawa | |
| 2011/0153184 | A1* | 6/2011 | Suh | B60L 5/40 |
| | | | | 701/117 |
| 2011/0214926 | A1* | 9/2011 | Ichikawa | H02J 50/80 |
| | | | | 180/2.1 |
| 2013/0002198 | A1 | 1/2013 | McCluskey et al. | |
| 2014/0205401 | A1* | 7/2014 | Bryant | B60P 3/064 |
| | | | | 414/373 |
| 2016/0226313 | A1 | 8/2016 | Okubo | |
| 2017/0136885 | A1* | 5/2017 | Ricci | B60L 5/005 |
| 2018/0313654 | A1* | 11/2018 | Aiuchi | B60N 2/01 |
| 2018/0314262 | A1* | 11/2018 | Aiuchi | A61G 5/046 |
| 2018/0314263 | A1* | 11/2018 | Aiuchi | G05D 1/0291 |
| 2019/0329692 | A1* | 10/2019 | Gaither | B60L 53/00 |

FOREIGN PATENT DOCUMENTS

| | | |
|---|---|---|
| JP | S 49-084834 U1 | 7/1974 |
| JP | S 50-105113 U1 | 8/1975 |
| JP | H 04-028701 U1 | 3/1992 |
| JP | H 05-286437 A | 11/1993 |
| JP | 2000-139030 A | 5/2000 |
| JP | 2001-299815 A | 10/2001 |
| JP | 2002-298812 A | 10/2002 |
| JP | 2004-114956 A | 4/2004 |
| JP | 2004-163295 A | 6/2004 |
| JP | 2006-006702 A | 1/2006 |
| JP | 2007-139486 A | 6/2007 |
| JP | 2009-078740 A | 4/2009 |
| JP | 2011-091999 A | 5/2011 |
| JP | 2011-167444 A | 9/2011 |
| JP | 2013-063705 A | 4/2013 |
| JP | 2015-015818 A | 1/2015 |
| JP | 2015-061377 A | 3/2015 |
| JP | 2016-097784 A | 5/2016 |
| JP | 2016-119784 A | 6/2016 |
| WO | WO 00/26059 A2 | 5/2000 |
| WO | WO 2015/037046 A1 | 3/2015 |

OTHER PUBLICATIONS

Japanese Office Action, dated Feb. 14, 2020, in Japanese Application No. 2019-057362 and English Translation thereof.
Japenese Office Action dated Mar. 24, 2020 with an English translation.

* cited by examiner

VEHICLE

CROSS-REFERENCE TO RELATED APPLICATIONS

The present application claims priority from Japanese Patent Application No. 2017-089156 filed on Apr. 28, 2017, the entire contents of which are hereby incorporated by reference.

BACKGROUND

1. Technical Field

The present invention relates to a vehicle capable of moving while carrying sub-mobility devices in which passengers sit.

2. Related Art

Conventionally, wheelchairs have been used by elderly persons and handicapped persons who have difficulty walking by themselves. In recent years, a personal mobility device such as a wheel chair capable of automatically running by an electric motor and so forth is being proposed. To realize a society where this personal mobility device becomes widespread, and therefore people having difficulty walking by themselves are easy to live active lives, it is desired that the personal mobility device is used by not only people having difficulty walking by themselves but also people who can walk by themselves. Therefore, it is important that a personal mobility device can get in a vehicle such as an automobile while a passenger sits in the personal mobility device, as an example of wheelchair disclosed in, for example, Japanese Unexamined Patent Applications No. 2006-006702 and 2004-114956.

SUMMARY OF THE INVENTION

An aspect of the present invention provides a vehicle including: a vehicle body, a positioning mechanism, and an electric power supply unit. The vehicle body is capable of carrying a sub-mobility device in which a passenger sits. The sub-mobility device includes an electric power receiving unit. The positioning mechanism is provided in the vehicle body and configured to position the sub-mobility device in the vehicle body at a predetermined location. The electric power supply unit is provided in the vehicle body and configured to supply electric power to the electric power receiving unit of the sub-mobility device positioned at the predetermined location, by contacting or approaching the electric power receiving unit.

DETAILED DESCRIPTION

Hereinafter, examples of the present invention will be described with reference to the drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following examples which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

When a sub-mobility device is carried in a vehicle, it is preferred that the sub-mobility device can be charged in the vehicle. By this means, even when a passenger gets in the sub-mobility device insufficiently charged and starts to travel, it is possible to charge the sub-mobility device in the vehicle. Then, after getting out of the vehicle, the passenger sitting in the sub-mobility device sufficiently charged can move to a destination, and move around in the destination. With this additional value, a next-generation transportation system with organically combined sub-mobility device and vehicle becomes more convenient, and therefore increased use of the sub-mobility device is expected.

Here, the sub-mobility device is not formed integrally with the vehicle, and therefore may move in the vehicle. Therefore, the sub-mobility device carried in the vehicle needs to be positioned and fixed in the vehicle. In addition, when the sub-mobility device is charged in the vehicle, the sub-mobility device should be electrically coupled to the vehicle while being positioned.

It is desirable to provide a vehicle that can carry the sub-mobility device in which a passenger sits, and charge the sub-mobility device while the sub-mobility device is carried in the vehicle.

Example 1

Figure 1:
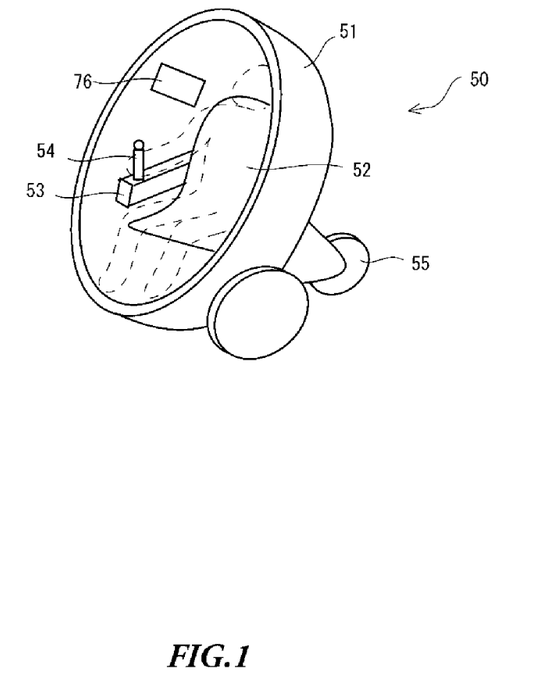
FIG. 1 is a schematic view illustrating an exemplary sub-mobility device applied to the present invention.

FIG. 1 is a schematic view illustrating an exemplary sub-mobility device 50 applied to the present invention. As illustrated in FIG. 1, the sub-mobility device 50 has an egg-shaped body 51. A seat 52 on which a passenger sits is disposed inside the body 51. Armrests 53 are disposed on the right and left sides of the seat 52. A control lever 54 is disposed in the front end of the armrest 53. In addition, a plurality of wheels 55 are provided on the lower part of the body 51.

Figure 2:
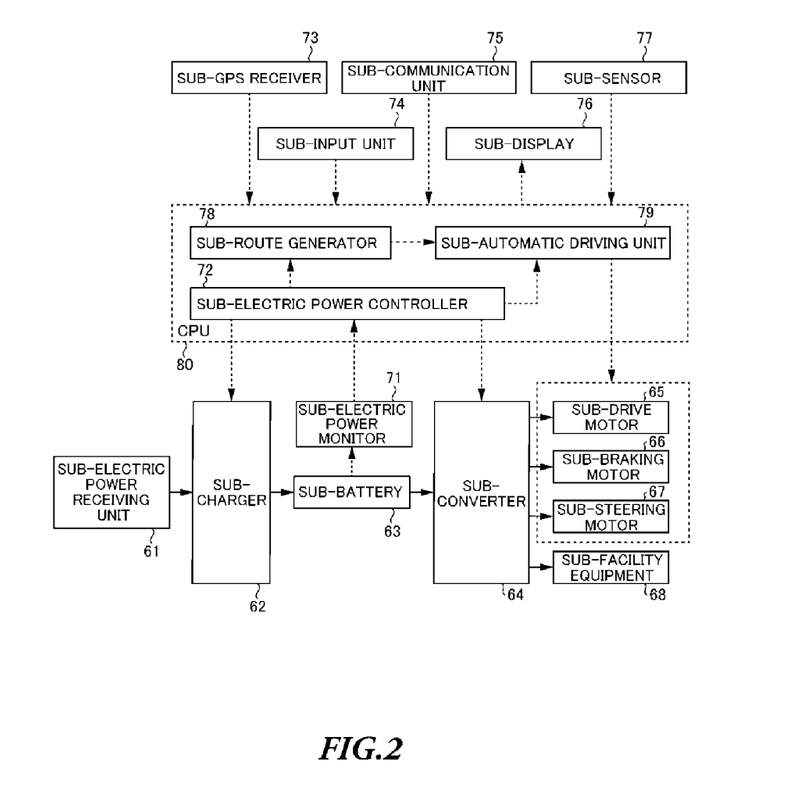
FIG. 2 illustrates an exemplary electric circuit of the sub-mobility device illustrated in FIG. 1.

FIG. 2 illustrates an exemplary electric circuit of the sub-mobility device 50 illustrated in FIG. 1. As illustrated in FIG. 2, the electric circuit of the sub-mobility device 50 includes an electric power system including a sub-electric power receiving unit 61, a sub-charger 62, a sub-battery 63, a sub-convertor 64, a sub-drive motor 65 for driving the plurality of wheels 55, a sub-braking motor 66, a sub-steering motor 67, and a sub-facility equipment 68.

The sub-electric power receiving unit 61 is coupled to, for example, a commercial electric power supply by a power cord. Electric power is supplied from the sub-electric power receiving unit 61 to the sub-charger 62, so that the sub-charger 62 charges the sub-battery 63. The sub-convertor 64 converts the electric power stored in the sub-battery 63, and supplies the converted electric power to loading devices such as the sub-drive motor 65, the sub-braking motor 66, the sub-steering motor 67, and the sub-facility equipment 68. The sub-drive motor 65 is driven to rotate the plurality of wheels 55, so that the sub-mobility device 50 can move forward or backward. The sub-steering motor 67 is driven to turn the wheels 55, so that the sub-mobility device 50 can turn to the right or the left. The sub-braking motor 66 is driven to stop the rotation of the plurality of wheels 55, so that the sub-mobility device 50 can be stopped. In this way, the sub-mobility device 50 can run carrying a passenger on the seat 52, by using the electric power stored in the sub-battery 63 charged by the sub-charger 62 supplied with the electric power from the sub-electric power receiving unit 61.

Moreover, as illustrated in FIG. 2, the electric circuit of the sub-mobility device 50 includes a control system including a sub-electric power monitor 71, a sub-electric power controller 72, a sub-GPS (global positioning system) receiver 73, a sub-input unit 74, a sub-communication unit 75, a sub-display 76, a sub-sensor 77, a sub-route generator 78, and a sub-automatic driving unit 79. The sub-electric power controller 72, the sub-route generator 78, and the sub-automatic driving unit 79 may be implemented when a CPU (central processing unit) 80 executes a program. This control system may receive the electric power from the sub-converter 64, as part of the above-described sub-facility equipment 68.

The sub-electric power monitor 71 monitors conditions of the sub-battery 63. The conditions of the sub-battery 63 include, for example, a charging voltage and a temperature. The sub-electric power controller 72 controls the sub-charger 62 and the sub-convertor 64, based on information from the sub-electric power monitor 71. For example, when the power cord is coupled to the sub-electric power receiving unit 61, and therefore the sub-charger 62 can charge the sub-battery 63, the sub-electric power controller 72 controls the charging of the sub-charger 62 until the voltage of the sub-battery 63 becomes a predetermined maximum voltage. When the voltage of the sub-battery 63 is lower than a predetermined minimum voltage, the sub-electric power controller 72 causes the sub-convertor 64 to stop the electric power conversion. In addition, when the voltage of the sub-battery 63 is equal to or lower than a voltage a little higher than the predetermined minimum voltage, the sub-electric power controller 72 causes the sub-converter 64 to reduce the electric power to be supplied to each of the loading devices. The sub-electric power controller 72 appropriately or periodically informs the sub-route generator 78 and the sub-automatic driving unit 79 of these power control states and the condition of the sub-battery 63.

The sub-GPS receiver 73 receives a radio wave from a GPS satellite. By receiving radio waves from a plurality of GPS satellites, it is possible to calculate the location of the sub-mobility device 50. The sub-input unit 74 is a device configured to receive the input operation of the passenger, and includes, for example, the above-described control lever 54. The sub-communication unit 75 communicates with a different device, such as a main communication unit 35 of an automobile 1 to transmit and receive data. In addition, the sub-communication unit 75 communicates with a base station, and therefore can acquire information on the location of the base station. The sub-display 76 is, for example, a liquid crystal device with touch panel. This touch panel may function as part of the sub-input unit 74. The sub-sensor 77 is configured to detect the location, the speed, and the surrounding environment of the sub-mobility device 50. The sub-route generator 78 receives, for example, a destination, and therefore generates a traveling route from the present location to the destination of the sub-mobility device 50. The sub-automatic driving unit 79 outputs control signals to the sub-drive motor 65, the sub-braking motor 66 and sub-steering motor 67, according to, for example, the generated traveling route. By this means, the sub-mobility device 50 can automatically move to the destination along the traveling route.

Here, to realize a society where the sub-mobility device 50 becomes widespread, and therefore people having difficulty walking by themselves are easy to live active lives, it is desired that the sub-mobility device 50 is used by not only people having difficulty walking by themselves but also people who can walk by themselves. Therefore, it is important that the sub-mobility device 50 can get in a vehicle such as the automobile 1 while a passenger sits in the sub-mobility device 50. In addition, when the sub-mobility device 50 is carried in the automobile 1, it is preferred that the sub-mobility device 50 can be charged in the automobile 1. By this means, even when a passenger gets in the sub-mobility device 50 insufficiently charged and starts to travel, it is possible to charge the sub-mobility device 50 in the automobile 1. Then, after getting out of the automobile 1, the passenger sitting in the sub-mobility device 50 sufficiently charged can move to a destination, and move around in the destination. With this additional value, a next-generation transportation system with organically combined sub-mobility and vehicle becomes more convenient, and therefore increased use of the sub-mobility device 50 is expected.

Here, the sub-mobility device 50 is not formed integrally with the automobile 1, and therefore may move in the automobile 1. Therefore, the sub-mobility device 50 carried in the automobile 1 needs to be positioned and fixed in the automobile 1. In addition, when the sub-mobility device 50 is charged in the automobile 1, the sub-mobility device 50 should be electrically coupled to the automobile 1 while being positioned.

In this way, the automobile 1 capable of carrying the sub-mobility device 50 in which a passenger sits is required to charge the sub-mobility device 50 while the sub-mobility device 50 is carried in the automobile 1.

Figure 3:
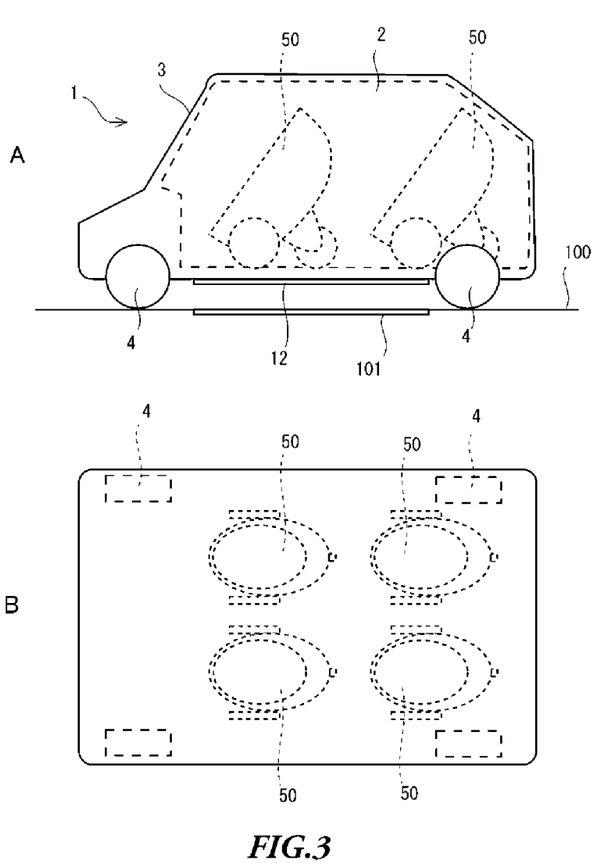
FIG. 3 is a schematic view illustrating an automobile according to an example of the present invention.

FIG. 3 is a schematic view illustrating the automobile 1 according to an example of the present invention. FIG. 3A is a side view, and FIG. 3B is a plan view. The automobile 1 illustrated in FIG. 3 includes a vehicle body 3 having a vehicle compartment 2, and wheels 4 provided on the lower part of the vehicle body 3. Four sub-mobility devices 50, each two of which are arranged in one line, are carried in the vehicle compartment 2. In addition, FIG. 3 illustrates a main electric power receiving coil 12 provided on a floor surface of the vehicle body 3, and an electric power transmission coil 101 provided on a driving lane 100 of a road surface on which the automobile 1 can run. The electric power transmission coil 101 can supply electric power to the automobile 1 running on the driving lane 100 of the road surface without contact with the automobile 1. The main electric power receiving coil 12 receives electric power supplied from the electric power transmission coil 101 located outside the automobile 1.

Figure 4:
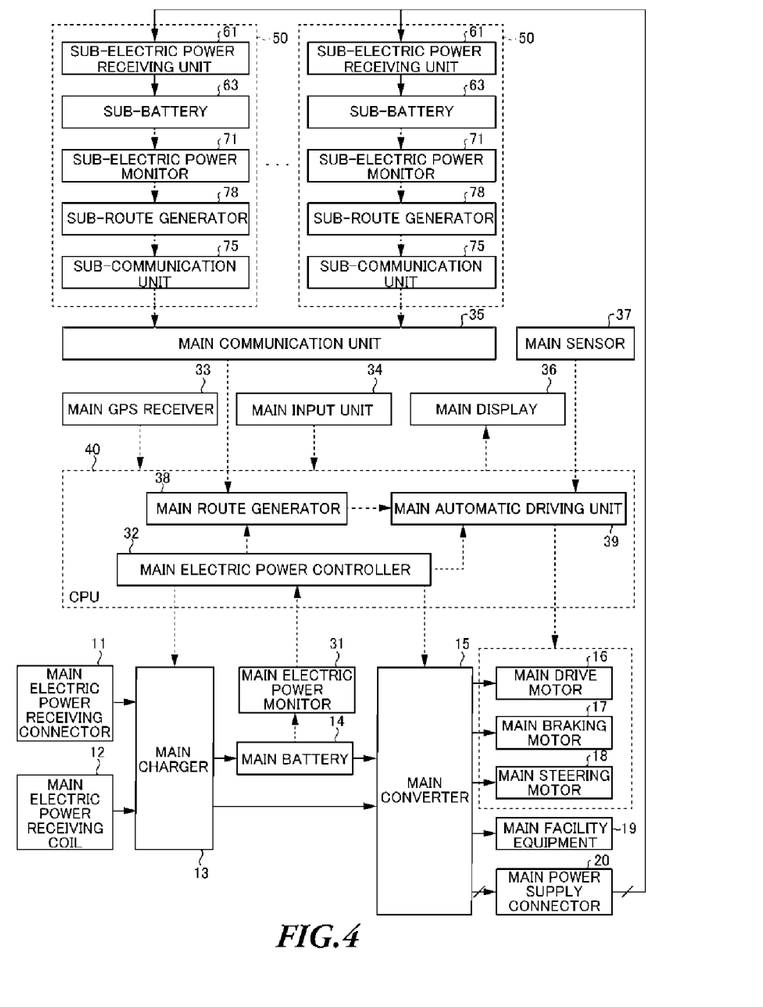
FIG. 4 illustrates an exemplary sub-mobility device charging system for the automobile illustrated in FIG. 3.

FIG. 4 illustrates an exemplary sub-mobility device charging system for the automobile 1 illustrated in FIG. 3. The automobile 1 is an example of vehicle. As illustrated in FIG. 4, the electric circuit of the automobile 1 illustrated in FIG. 3 includes an electric power system including a main electric power receiving connector 11, the main electric power receiving coil 12, a main charger 13, the main battery 14, a main converter 15, a main drive motor 16 for driving the plurality of wheels 4, a main braking motor 17, a main steering motor 18, a main facility equipment 19, and a main electric power supply connector 20.

The main electric power receiving connector 11 is used when the automobile 1 is parked, and coupled to, for example, a commercial electric power supply by a power cord. Electric power is supplied from the main electric power receiving coil 12 or the main electric power receiving connector 11 to the main charger 13, so that the main charger 13 charges the main battery 14. The main converter 15 converts the electric power stored in the main battery 14, and supplies the converted electric power to loading devices such as the main drive motor 16, the main braking motor 17, the main steering motor 18, the main facility equipment 19 and the main electric power supply connector 20. The main converter 15 supplies the electric power supplied to the main electric power receiving connector 11 and the main electric power receiving coil 12, or the electric power stored in the main battery 14, to the main electric power supply connector 20. The main electric power supply connector 20 is coupled to the sub-electric power receiving connector 61 of the sub-mobility device 50 carried in the automobile 1 by, for example, a power cord. The main electric power supply connector 20 is used to supply the electric power from the automobile 1 to the sub-mobility devices 50 carried in the automobile 1. The main drive motor 16 is driven to rotate the plurality of wheels 4, so that the automobile 1 can move forward or backward. The main steering motor 18 is driven to turn the wheels 4, so that the automobile 1 can turn to the right or the left. The main braking motor 17 is driven to stop the rotation of the plurality of wheels 4, so that the automobile 1 can be stopped. In this way, the automobile 1 can run carrying the sub-mobility devices 50, by using the electric power stored in the main battery 14 charged by the main charger 13 supplied with the electric power from the main electric power receiving coil 12 or the main electric power receiving connector 11.

In addition, as illustrated in FIG. 4, the electric circuit of the automobile 1 includes a control system including a main electric power monitor 31, a main electric power controller 32, a main GPS receiver 33, a main input unit 34, a main communication unit 35, a main display 36, a main sensor 37, a main route generator 38, and a main automatic driving unit 39. The main electric power controller 32, the main route generator 38, and the main automatic driving unit 39 may be implemented when a CPU 40 as a controller executes a program. The CPU 40 may be provided in the automobile 1 as an ECU. As part of the above-described main facility equipment 19, each of these components of the control system may be supplied with electric power from the main converter 15.

The main electric power monitor 31 monitors conditions of the main battery 14. The conditions of the main battery 14 include, for example, a charging voltage and a temperature.

The main electric power controller 32 controls the main charger 13 and the main convertor 15, based on information from the main electric power monitor 31. The main electric power controller 32 controls to supply electric power from the main converter 15 to the sub-mobility devices 50 via the main electric power supply connector 20. For example, when the power cord is coupled to the main electric power receiving connector 11, and therefore the main charger 13 can charge the main battery 14, the main electric power controller 32 controls the charging of the main charger 13 until the voltage of the main battery 14 becomes a predetermined maximum voltage.

The main GPS receiver 33 receives a radio wave from GPS satellite. By receiving radio waves from a plurality of GPS satellites, it is possible to calculate the location of the automobile 1. Here, the main GPS receiver 33 may receive, for example, other radio waves, and acquire a corrected location of the automobile 1 based on the radio waves. The main input unit 34 is a device configured to receive the input operation of the passenger. The main communication unit 35 communicates with other devices, for example, the sub-communication unit 75 of the sub-mobility device 50 to transmit and receive data. In addition, the main communication unit 35 communicates with the base station, and therefore can acquire information on the location of the base station. The main display 36 is, for example, a liquid crystal device with touch panel. This touch panel may function as part of the main input unit 34. The liquid crystal device with touch panel is disposed on, for example, the front surface of the vehicle compartment 2. By this means, the passengers in the plurality of sub-mobility devices 50 can view the same display. The main sensor 37 is configured to detect the location, the speed, and the surrounding environment of the automobile 1. The main route generator 38 receives, for example, a destination, and therefore generates a traveling route from the present location to a stop-off point of the automobile 1. The stop-off point may be the same as the destination, or a location near the destination where the automobile 1 can be parked. The main automatic driving unit 39 outputs control signals to the main drive motor 16, the main braking motor 17 and the main steering motor 18, according to, for example, the generated traveling route. By this means, the automobile 1 can automatically move to the destination along the traveling route.

Figure 5:
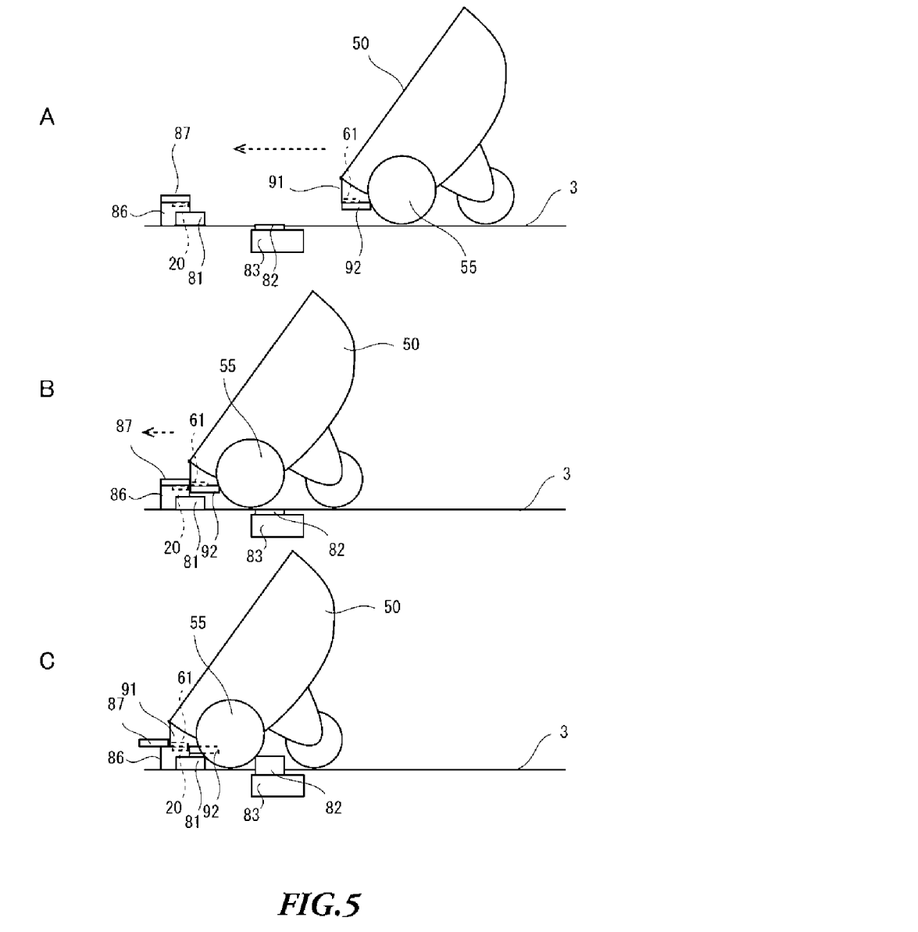
FIG. 5 illustrates a positioning mechanism and an electrically coupling mechanism for the sub-mobility device according to Example 1.

Next, collaboration control by the sub-mobility devices 50 and the automobile 1 will be described. FIG. 5 illustrates a positioning mechanism and an electrically coupling mechanism for the sub-mobility device 50 according to Example 1. In FIG. 5, the sub-mobility device 50 is placed on the floor surface of a passenger compartment 2 formed in the vehicle body 3 of the automobile 1.

The automobile 1 includes a positioning mechanism constituted by a front vehicle stopper 81, a rear vehicle stopper 82, and a stopper actuator 83. The front vehicle stopper 81 protrudes upward from the floor surface of the passenger compartment 2, and contacts the wheel 55 of the sub-mobility device 50. The stopper actuator 83 is disposed under the floor surface of the passenger compartment 2, and moves the rear vehicle stopper 82 up and down. The rear vehicle stopper 82 can protrude upward from the floor surface behind the wheel 55 contacting the front vehicle stopper 81. By this means, the wheel 55 of the sub-mobility device 50 is positioned on the floor surface of the vehicle compartment 2 so as not to rotate.

In addition, in the automobile 1, a protruding member 86 configured to protrude upward from the floor surface of the vehicle compartment 2 is provided near the front vehicle stopper 81. The main electric power supply unit 20, as an electrically coupling mechanism of the automobile 1, is exposed on the upper surface of the protruding member 86. The exposed portion of the main electric power supply unit 20 may be, for example, a metallic plate coupled to the main converter 15. A main cover 87 is provided on the protruding member 86 to be able to slide to cover the main electric power supply unit 20. The main cover 87 may be made of an insulating material and therefore is not electrically conductive. By this means, the main electric power supply unit 20 made of the metallic plate is normally covered with the insulating main cover 87.

The sub-mobility device 50 includes a protrusion 91 which protrudes downward in the middle of the lower surface of the egg-shaped body 51. The sub-electric power receiving unit 61, as an electrically coupling mechanism of the sub-mobility device 50, is exposed on the lower surface of the protrusion 91. The exposed portion of the sub-electric power receiving unit 61 may be, for example, a metallic plate coupled to the sub-charger 62. A sub-cover 92 is provided under the protrusion 91 to be able to slide to cover the sub-electric power receiving unit 61. The sub-cover 92 may be made of an insulating material and therefore is not electrically conductive. By this means, the sub-electric power receiving unit 61 made of the metallic plate is usually covered with the insulating sub-cover 92.

Then, as illustrated in FIG. 5A, the sub-mobility device 50 gets on the floor surface of the passenger compartment 2 from a location spaced from the protruding member 86. Next, the sub-mobility device 50 automatically moves to the protruding member 86 as illustrated in FIG. 5B. Then, the sub-cover 92 slidably provided under the protrusion 91 of the sub-mobility device 50 contacts the main cover 87 slidably provided over the protruding member 86. When the sub-mobility device 50 further automatically moves forward, the sub-cover 92 and the main cover 87 pushing one another slide to expose the main electric power supply unit 20 on the upper surface of the protruding member 86 and the sub-electric power receiving unit 61 on the lower surface of the protrusion 91, so that the main electric power supply unit 20 and the sub-electric power receiving unit 61 contact one another as illustrated in FIG. 5C. By this means, the main electric power supply unit 20 and the sub-electric power receiving unit 61 contact and are electrically coupled to one another. In addition, the rear vehicle stopper 82 is moved upward by the stopper actuator 83, and the front vehicle stopper 81 and the rear vehicle stopper 82 constituting the positioning mechanism sandwich the front and the rear of the wheel 55 of the sub-mobility device 50 to hold the wheel 55. By this means, the sub-mobility device 50 is positioned over the floor surface of the vehicle body 3 and fixed at the location where the main electric power supply unit 20 and the sub-electric power receiving unit 61 contact and are electrically coupled to one another. Moreover, the automobile 1 can supply electric power to the positioned sub-mobility device 50.

With the present example, as described above, the mechanism for positioning the sub-mobility device 50 in the automobile 1 is provided, and therefore it is possible to position the sub-mobility device 50 in the automobile 1 at a predetermined location. In addition, the sub-electric power receiving unit 61 of the sub-mobility device 50 can contact or approach the main electric power supply unit 20 of the automobile 1 while the sub-mobility device 50 is positioned at the predetermined location. Then, the sub-mobility device 50 can be electrically coupled to the automobile 1. Therefore, the automobile 1 can supply electric power to the sub-electric power receiving unit 61 of the sub-mobility device 50 contacting or approaching the main electric power supply unit 20. With the present example, the sub-mobility device 50 moves on the floor surface of the vehicle body 3 toward the protruding member 86, and is held by the positioning mechanism, and therefore is positioned in the vehicle body 3 at the predetermined location. With the present example, when the sub-mobility device 50 is not moved to the predetermined location, the main electric power supply unit 20 is covered with the main cover 87. Therefore, at least in an electrically non-conductive state, the main electric power supply unit 20 is not likely to be dirtied or wetted by the sub-mobility device 50 carried in the vehicle 50. With the present example, the main cover 87 is pushed by the sub-mobility device 50 moving to the predetermined location and therefore slides. Accordingly, it is possible to remove the main cover 87 from the main electric power supply unit 20 only when the sub-mobility device 50 is positioned in the predetermined location. In any other case, the main electric power supply unit 20 can be covered with the main cover 87. With the present example, when the sub-mobility device 50 is not moved to the predetermined location, the sub-electric power receiving unit 61 is covered with the sub-cover 92. Therefore, at least in an electrically non-conductive state, the sub-electric power receiving unit 61 is not likely to be dirtied or wetted. With the present example, when the sub-mobility device 50 moves to the predetermined location, the sub-cover 92 contacts a component of the vehicle body 3 and is pushed by the component, and therefore slides. Therefore, only when the sub-mobility device 50 is positioned in the predetermined location, it is possible to remove the sub-cover 92 from the sub-electric power receiving unit 61. In any other case, the sub-electric power receiving unit 61 can be covered with the sub-cover 92.

Here, with the present example, the protruding member 86 protrudes upward from the floor surface of the passenger compartment 2. In addition, for example, the protruding member 86 may protrude horizontally from a side panel and so forth of the passenger compartment 2.

Example 2

Next, the automobile 1 according to Example 2 will be described. For the same components as those in Example 1, the same names, descriptions, and illustrations as in Example 1 are used. Hereinafter, differences from Example 1 will be mainly described.

Figure 6:
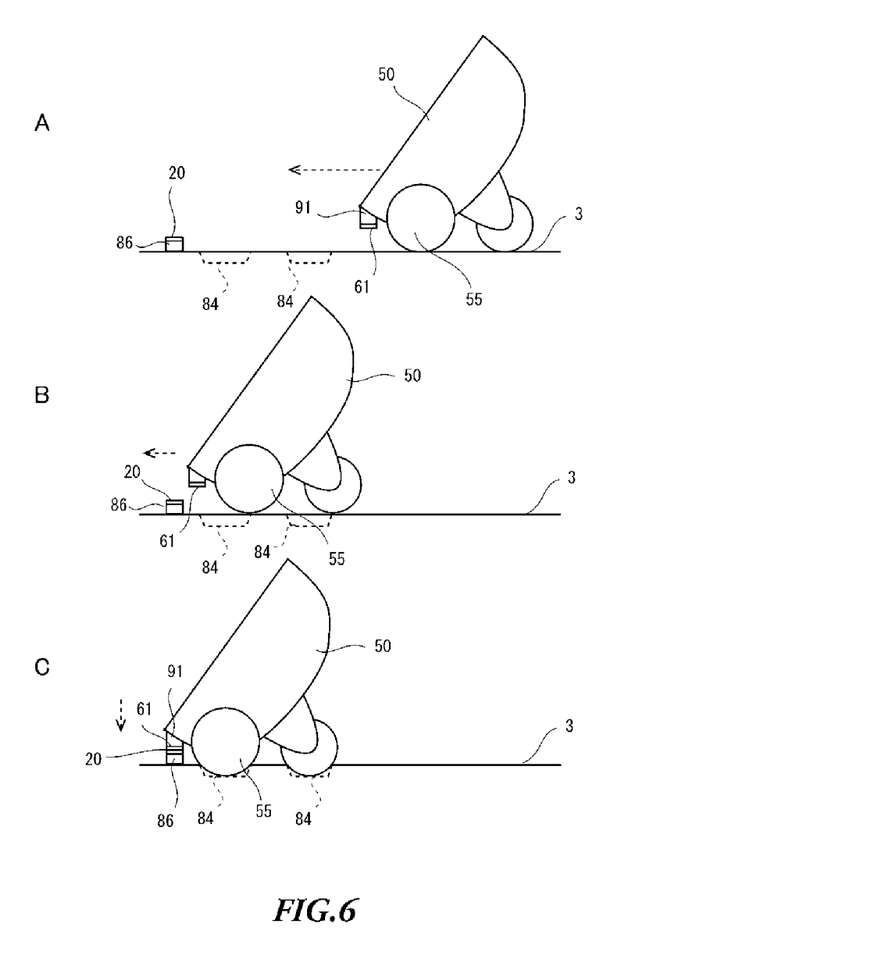
FIG. 6 illustrates a positioning mechanism and an electrically coupling mechanism for the sub-mobility device according to Example 2.

FIG. 6 illustrates a positioning mechanism and an electrically coupling mechanism for the sub-mobility device 50 according to Example 2. As the positioning mechanism, concave portions 84 for receiving the wheels 55 are formed on the floor surface of the vehicle body 3.

The sub-mobility device 50 moves on the floor surface of the passenger compartment 2 from a location spaced from the protruding member 86 as illustrated in FIG. 6A toward the protruding member 86 as illustrated in FIG. 6B. Then, the wheels 55 fit in the concave portions 84 and are positioned as illustrated in FIG. 6C. In this case, the sub-electric power receiving unit 61 comes down to the main electric power supply unit 20 to contact the main electric power supply unit 20, and therefore the sub-electric power receiving unit 61 and the main electric power supply unit 20 are electrically coupled to one another. By this means, the sub-mobility device 50 is positioned and fixed on the floor surface of the vehicle body 3 at the location where the main electric power supply unit 20 and the sub-electric power receiving unit 61 contact and are electrically coupled to one another. Moreover, the automobile 1 can supply electric power to the sub-mobility device 50 positioned in the automobile 1.

Here, with the present example, the main electric power supply unit 20 is not covered with the main cover 87. Also, the sub-electric power receiving unit 61 is not covered with the sub-cover 92. However, the main electric power supply unit 20 may be covered with the main cover 87, and the sub-electric cover receiving unit 61 may be covered with the sub-cover 92.

Example 3

Next, the automobile 1 according to Example 3 will be described. For the same components as those in Example 2, the same names, descriptions, and illustrations as in Example 2 are used. Hereinafter, differences from Example 2 will be mainly described.

Figure 7:
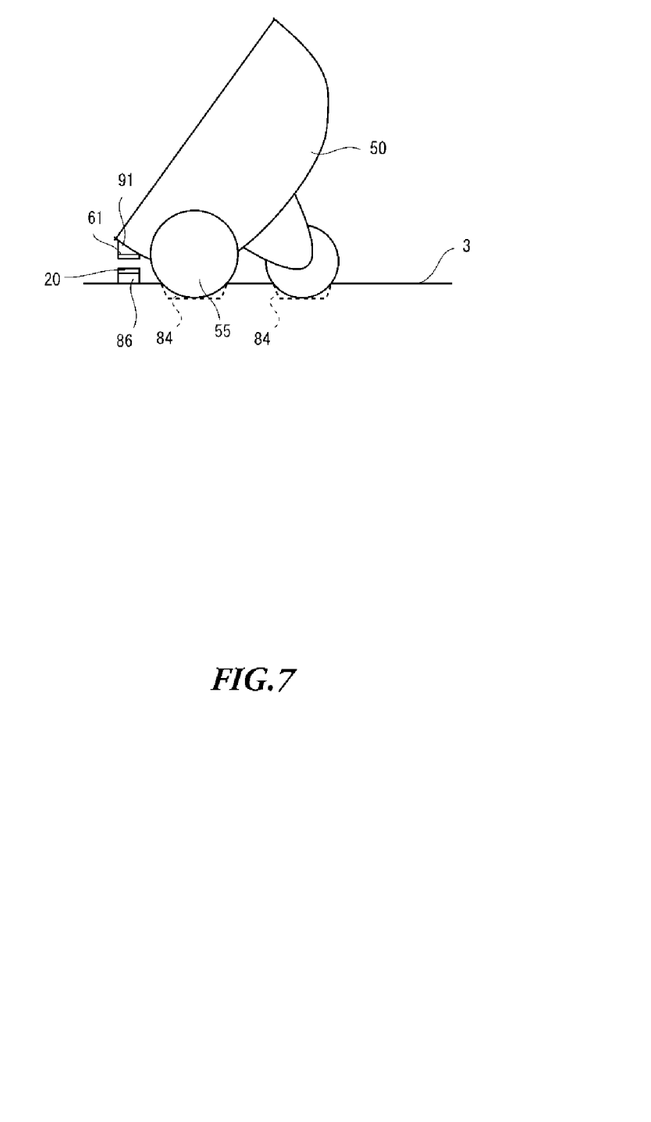
FIG. 7 illustrates a positioning mechanism and an electrically coupling mechanism for the sub-mobility device according to Example 3.

FIG. 7 illustrates a positioning mechanism and an electrically coupling mechanism for the sub-mobility device 50 according to Example 3. As illustrated in FIG. 7, the sub-electric power receiving unit 61 and the main electric power supply unit 20 approach one another while they are spaced from one another. In this case, the sub-electric power receiving unit 61 and the main electric power supply unit 20 are formed by, for example, coils, and therefore can be electrically coupled to one another while they are spaced from one another.

Example 4

Next, the automobile 1 according to Example 4 will be described. For the same components as those in Example 1, the same names, descriptions, and illustrations as in Example 1 are used. Hereinafter, differences from Example 1 will be mainly described.

Figure 8:
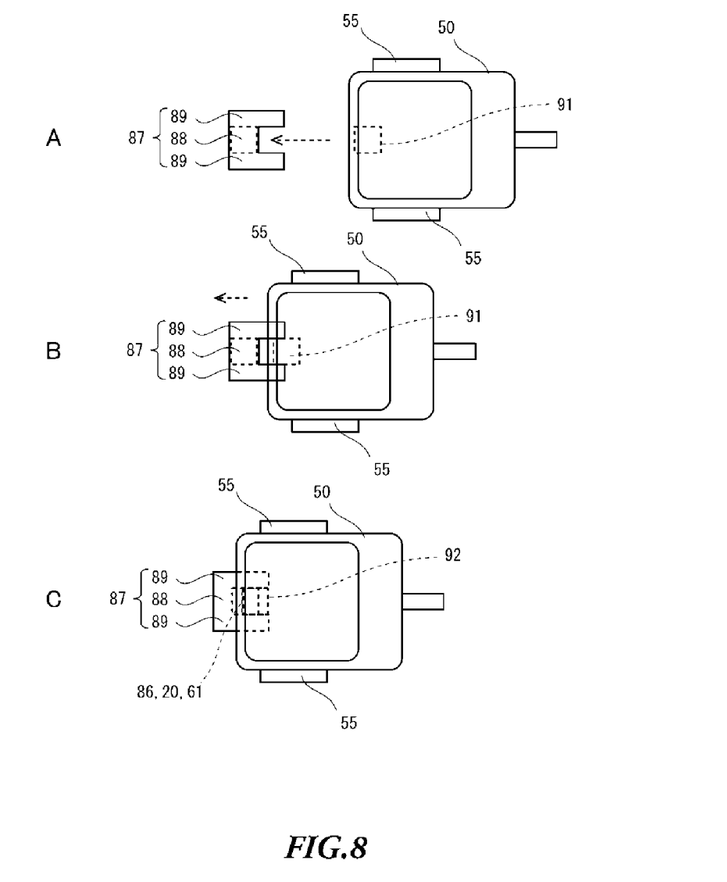
FIG. 8 illustrates an electrically coupling mechanism for the sub-mobility device according to Example 4.

FIG. 8 illustrates an electrically coupling mechanism for the sub-mobility device 50 according to Example 4. In FIG. 8, the positioning mechanism is not illustrated. In FIG. 8, the main cover 87 includes a covering portion 88 configured to cover the main electric power supply unit 20 over the protruding member 86, and a pair of guides 89 provided in each side of the covering member 88. The pair of guides 89 protrudes backward more than the covering member 88 along the direction in which the sub-mobility device 50 approaches the protruding member 86.

In this case, the sub-mobility device 50 automatically moves from the location where the sub-mobility device 50 gets in the automobile 1 as illustrated in FIG. 8A toward the protruding member 86 as illustrated in FIG. 8B. Then, the sub-cover 92 slidably provided under the protrusion 91 of the sub-mobility device 50 fits between the pair of guides 89 of the main cover 87 slidably provided over the protruding member 86. When the sub-mobility device 50 further automatically moves forward, the sub-cover 92 and the main cover 87 pushing one another slide to expose the main electric power supply unit 20 on the upper surface of the protruding member 86 and the sub-electric power receiving unit 61 on the lower surface of the protrusion 91, so that the main electric power supply unit 20 and the sub-electric power receiving unit 61 contact one another as illustrated in FIG. 8C. By this means, the main electric power supply unit 20 and the sub-electric power receiving unit 61 contact and are electrically coupled to one another. The automobile 1 can supply electric power to the sub-mobility device 50 positioned in the automobile 1.

With the present example, as described above, the main cover 87 includes the pair of guides 89 configured to extend along the direction in which the sub-mobility device 50 moves to the predetermined location where the sub-mobility device 50 is positioned. Therefore, when the sub-mobility device 50 approaches the protruding member 86, it is possible to finely adjust the moving direction of the sub-mobility device 50 such that the sub-cover 92 of the sub-mobility device 50 fits between the pair of guides 89 of the main cover 87, and therefore the main electric power supply unit 20 and the sub-electric power receiving unit 61 are electrically coupled to one another. It is possible to appropriately position the sub-mobility device 50 at the predetermined location. Moreover, since the sub-mobility device 50 moves in a constant direction, the main cover 87 and the sub-cover 92 can be pushed by the movement of the sub-mobility device 50 in an appropriate direction and slide.

Example 5

Next, the automobile 1 according to Example 5 will be described. For the same components as those in Example 1, the same names, descriptions, and illustrations as in Example 1 are used. Hereinafter, differences from Example 1 will be mainly described.

Figure 9:
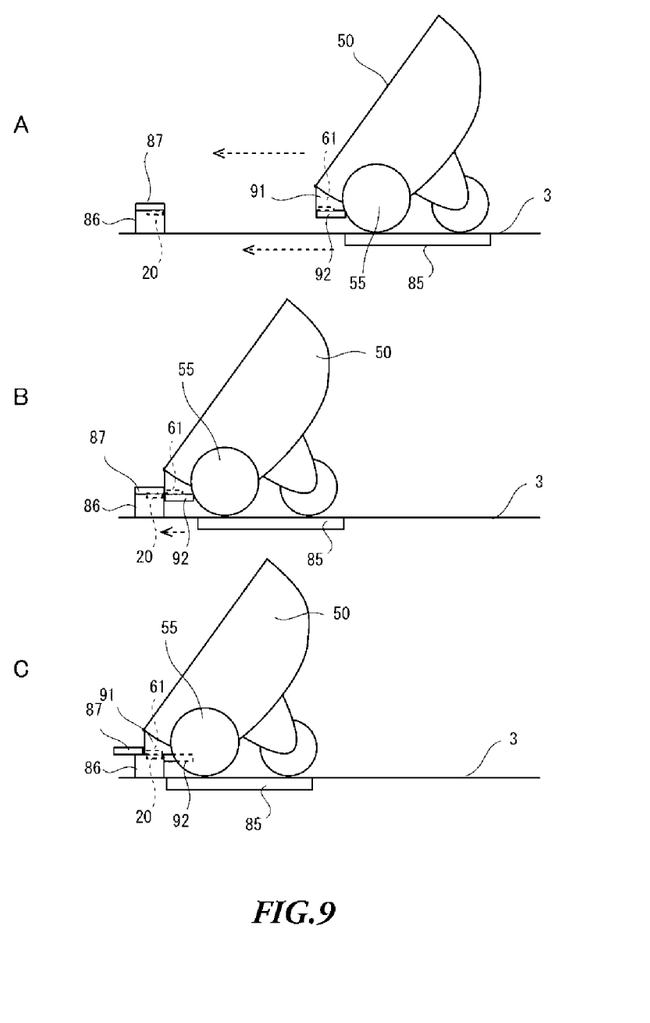
FIG. 9 illustrates a positioning mechanism and an electrically coupling mechanism for the sub-mobility device according to Example 5.

FIG. 9 illustrates a positioning mechanism and an electrically coupling mechanism for the sub-mobility device 50 according to Example 5. As illustrated in FIG. 9, a platform 85 on which the sub-mobility device 50 is placed is provided on the floor surface of the vehicle body 3. The platform 85 is configured to be able to slide on the floor surface of the vehicle body 3 from the location where the sub-mobility device 50 gets in the automobile 1 toward the protruding member 86 by an actuator (not illustrated).

In this case, the sub-mobility device 50 is placed on the platform 85 in the location where the sub-mobility device 50 gets in the automobile 1 as illustrated in FIG. 9A. Here, the sub-mobility device 50 may be positioned and fixed on the platform 85 at the time of getting in the automobile 1. Next, the platform 85 moves to the protruding member 86 as illustrated in FIG. 9B. Then, the sub-cover 92 slidably provided under the protrusion 91 of the sub-mobility device 50 contacts the main cover 87 slidably provided over the protruding member 86. Moreover, when the platform 85 further moves, the sub-cover 92 and the main cover 87 pushing one another slide to expose the main electric power supply unit 20 on the upper surface of the protruding member 86 and the sub-electric power receiving unit 61 on the lower surface of the protrusion 91, so that the main electric power supply unit 20 and the sub-electric power receiving unit 61 contact one another as illustrated in FIG. 9C. By this means, the main electric power supply unit 20 and the sub-electric power receiving unit 61 contact and are electrically coupled to one another. The automobile 1 can supply electric power to the sub-mobility device 50 positioned on the platform 85.

With the present example, as described above, the platform 85 is slidably provided on the floor surface of the vehicle body 3 to move to the predetermined location where the sub-mobility device 50 is positioned, and therefore the sub-mobility device 50 placed on the platform 85 is moved to the predetermined location. Consequently, it is possible to appropriately position the sub-mobility device 50 at the predetermined location without automatic movement of the sub-mobility device 50 in the automobile 1. As a result, it is possible to prevent the occurrence of any trouble because the sub-mobility device 50 automatically moves in the automobile 1 in which various components are disposed.

While the above-described examples are preferred examples of the present invention, it is to be understood that the invention is not limited to these examples. The present invention is intended to cover various modification and alteration without departing from the spirit and scope of the present invention.

The invention claimed is:

1. A vehicle, comprising:
a vehicle body capable of carrying a sub-mobility device in which a seat is provided for a passenger of the vehicle to sit while the vehicle carries the sub-mobility device, the sub-mobility device comprising an electric power receiving unit;
a positioning mechanism provided in the vehicle body and configured to position the sub-mobility device in the vehicle body at a predetermined location;
an electric power supply unit provided in the vehicle body and configured to supply electric power to the electric power receiving unit positioned at the predetermined location by contacting the electric power receiving unit; and
a main non-conductive member including an insulating material and configured to cover the electric power supply unit,
wherein the main non-conductive member is configured to contact a sub-non-conductive member including an insulating material and configured to cover the electric power receiving unit, and
wherein, when the sub-mobility device moves to the predetermined location:
the main non-conductive member is configured to be pushed by the sub-non-conductive member with the mobility device moving to the predetermined location and is further configured to move to expose the electric power supply unit; and
the sub-non-conductive member is configured to be pushed by the main non-conductive member and is further configured to move to expose the electric power receiving unit.

2. The vehicle according to claim 1, wherein the electric power supply unit is provided on a protruding member protruding from a floor surface or a side surface of the vehicle body, and
wherein the positioning mechanism holds the sub-mobility device moving on the floor surface of the vehicle body toward the protruding member to position the sub-mobility device in the vehicle at the predetermined location.

3. The vehicle according to claim 2, further comprising a main non-conductive member configured to cover the electric power supply unit before the electric power receiving unit of the sub-mobility device contacts or approaches the electric power supply unit, the main non-conductive member being configured to move to expose the electric power supply unit when the sub-mobility device moves to the predetermined location.

4. The vehicle according to claim 3, wherein the main non-conductive member is pushed by the sub-mobility device moving to the predetermined location to slide the main non-conductive member.

5. The vehicle according to claim 3, wherein the main non-conductive member or the sub-non-conductive member of the sub-mobility device is configured to extend along a direction in which the sub-mobility device moves to the predetermined location, and to be able to function as a guide for the sub-mobility device to move.

6. The vehicle according to claim 2, wherein the sub-mobility device comprises the sub-non-conductive member configured to cover the electric power receiving unit, the sub-non-conductive member being configured to move to expose the electric power receiving unit when the sub-mobility device moves to the predetermined location.

7. The vehicle according to claim 6, wherein the sub-non-conductive member contacts the vehicle body and is pushed by the vehicle body to slide to slide the sub-non-conductive member when the sub-mobility device moves to the predetermined location.

8. The vehicle according to claim 2, wherein the sub-mobility device moves on a floor surface of the vehicle body while being carried on a platform slidable on a floor surface to the predetermined location.

9. The vehicle according to claim 1, wherein the sub-mobility device comprises the sub-non-conductive member configured to cover the electric power receiving unit, the sub-non-conductive member being configured to move to expose the electric power receiving unit when the sub-mobility device moves to the predetermined location.

10. The vehicle according to claim 9, wherein the sub-non-conductive member contacts the vehicle body and is pushed by the vehicle body to slide the sub-non-conductive member when the sub-mobility device moves to the predetermined location.

11. The vehicle according to claim 1, wherein, as the positioning mechanism, a concave portion, configured to receive a wheel of the sub-mobility device, is formed on a floor surface of the vehicle body on which the sub-mobility device moves, and
wherein the electric power supply unit contacts or approaches the electric power receiving unit of the sub-mobility device while the wheel of the sub-mobility device fits in the concave portion.

12. The vehicle according to claim 1, wherein the main non-conductive member or the sub-non-conductive member of the sub-mobility device is configured to extend along a direction in which the sub-mobility device moves to the predetermined location, and to be able to function as a guide for the sub-mobility device to move.

13. The vehicle according to claim 1, wherein the sub-mobility device moves on a floor surface of the vehicle body while being carried on a platform slidable on a floor surface to the predetermined location.

14. The vehicle according to claim 1, wherein the sub-mobility device moves in a driving direction of the vehicle for the contacting or the approaching of the electric power supply unit to the electric power receiving unit of the sub-mobility device.

15. The vehicle according to claim 1, wherein the electric power supply unit supplies the electric power to the electric power receiving unit of the sub-mobility device positioned at the predetermined location by the contacting with the electric power receiving unit.

16. The vehicle according to claim 1, wherein the electric power supply unit supplies the electric power to the electric power receiving unit of the sub-mobility device positioned at the predetermined location by approaching to the electric power receiving unit.

17. The vehicle according to claim 1, wherein the electric power supply unit is provided on a protruding member protruding from a surface of the vehicle body.

18. The vehicle according to claim 17, wherein the positioning mechanism holds the sub-mobility device moving on the floor surface of the vehicle body toward the protruding member.

\* \* \* \* \*